April 26, 1949.  F. T. POWERS  2,468,460
PLATE BURNER

Filed Jan. 14, 1947  2 Sheets-Sheet 1

INVENTOR
Frank T. Powers
BY
Morgan, Finnegan & Durham
ATTORNEYS

April 26, 1949. F. T. POWERS 2,468,460
PLATE BURNER
Filed Jan. 14, 1947 2 Sheets-Sheet 2
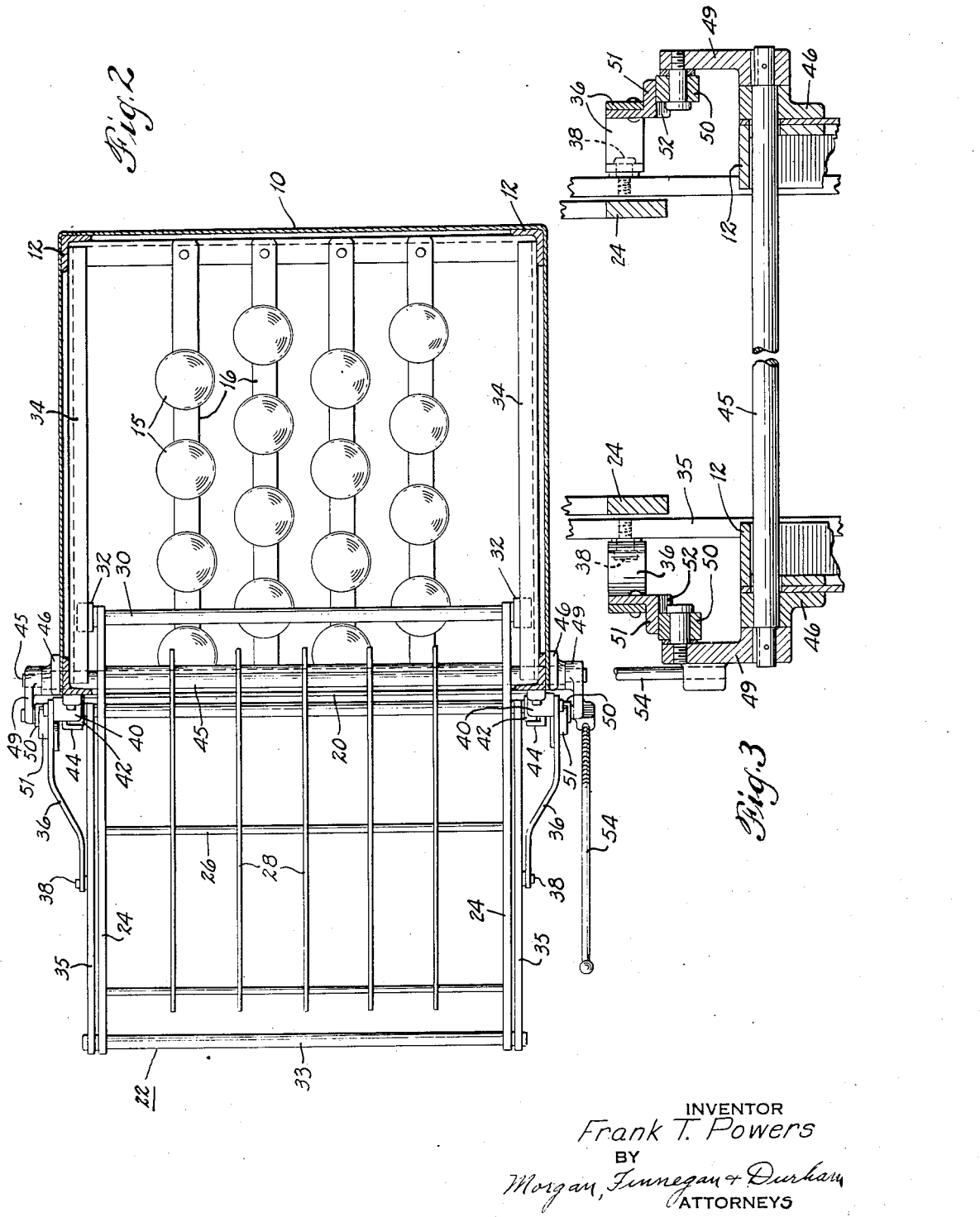
INVENTOR
Frank T. Powers
BY
Morgan, Finnegan & Durham
ATTORNEYS Patented Apr. 26, 1949

2,468,460

UNITED STATES PATENT OFFICE 2,468,460

PLATE BURNER

Frank T. Powers, Glen Cove, N. Y.; Frank T. Powers, Jr., and John M. Powers, executors of said Frank T. Powers, deceased, assignors to Powers Photo Engravers Company, a corporation of New York Application January 14, 1947, Serial No. 722,028

2 Claims. (Cl. 214—26)

The present invention relates to new and useful improvements in plate burners for use in photoengraving.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 2 is a sectional view taken on the line 2—2 of Figure 1; and

Figure 3 is a fragmentary detailed sectional view taken on the line 3—3 of Figure 1.

Figure 1:
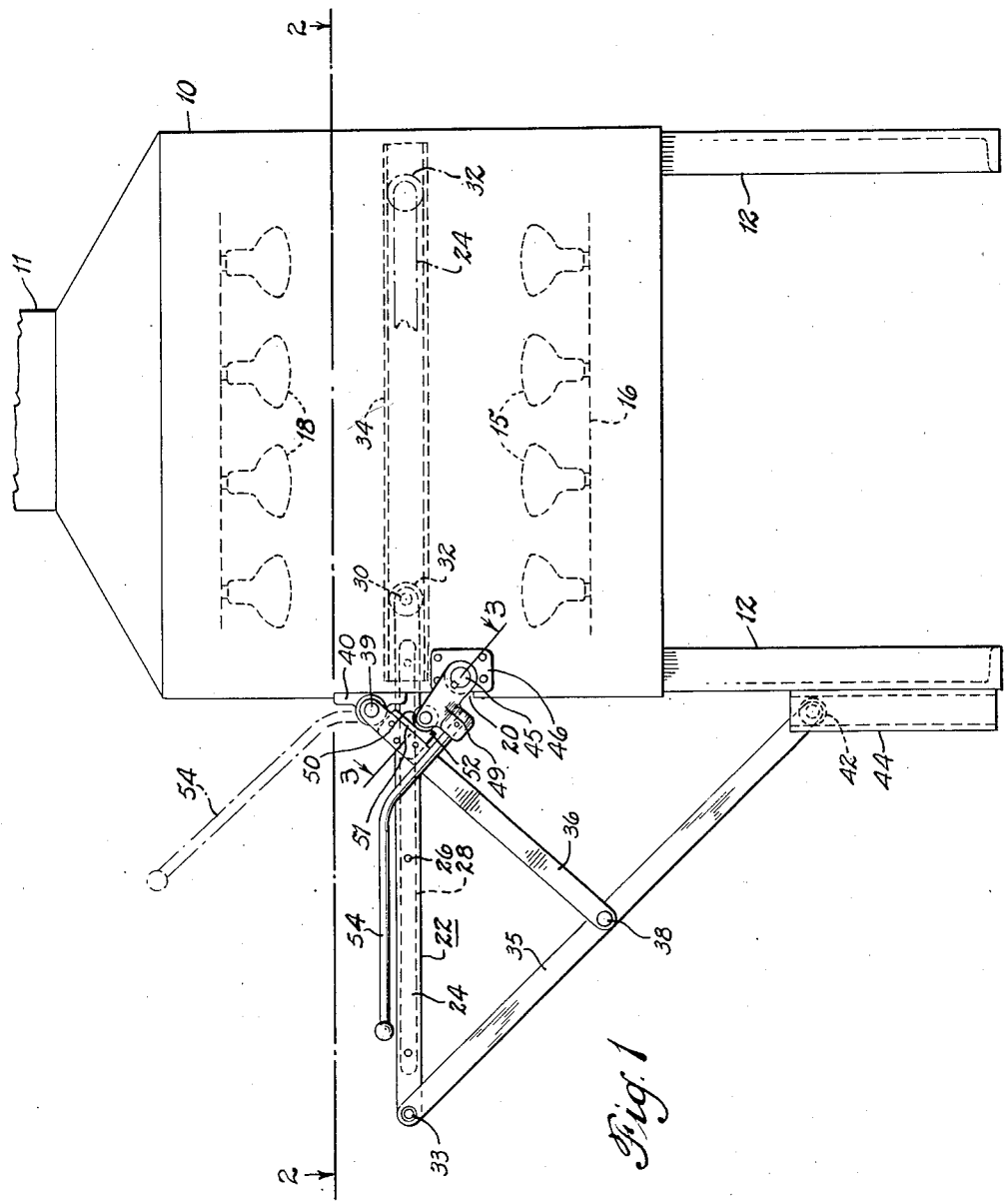
Figure 1 is a side elevation, partly diagrammatic, of a typical and illustrative embodiment of the present invention.

The present invention has for its object the provision of a novel and improved plate burner particularly adapted for use in photoengraving. The invention provides an improved apparatus for horizontally moving an exposed and developed photoengraving plate into a heated zone and which is conveniently controlled and operated with a minimum of effort. The invention has for a further object the provision of an infra-red radiantly heated plate burner in which the plate is moved into and out of burned position in a substantially horizontal path.

In accordance with the illustrated and preferred embodiment of the invention, there are provided two horizontally extending series of infra red radiant lamps one set above the other with a horizontal space between them, the lamps being enclosed within a cabinet which is provided with a narrow slot along one side through which the plate carrying carriage slides to move the plate between and away from the lamps. One end of the carriage is guided in channels at the sides of the carriage while the other end of the carriage is supported by a compound lever system which also acts as a weight tending to return the carriage to its normal position within the cabinet. A handle is pivoted on the carriage, and is linked by cam motion to the lever system so that movement of the handle rapidly moves the carriage out of the cabinet and locks it in its extended position, and can be easily released so that the weight of the lever system will cause the carriage to slide into plate burning position.

Referring now in detail to the accompanying drawings, there is provided a hollow cabinet 10 which may conveniently be of a general cubical shape connected to a flue or other vent 11, and supported on legs 12 which hold it at a convenient height. Within the cabinet is a lower bank of infra-red radiant heating lamps 15 mounted on strips 16 extending from one side of the frame to another, a sufficient number of lamps being provided to give an intense, substantially uniform radiation a short distance above the lamps. Above the bank of lamps 15 and directed in the opposite direction is an upper bank of lamps 18 similarly arranged and supported.

One side wall of the cabinet is interrupted to provide a long, narrow, horizontally extending slot 20, substantially midway between the banks 15 and 18, through which the plate carriage 22 may be moved into and out of the cabinet. The plate carriage 22 comprises side frames 24 between which are supported rods 26, these rods supporting and spacing the thin plate supporting strips 28 adapted to receive the photoengraving to be burned. At the inner end of the carriage and extending between the side members 24 is a heavy rod 30, at either end of which is a rotatably mounted roller 32 to roll in its own channel guideways 34 supported on one of the opposite walls on the inside of the cabinet 10 and extending horizontally from front to back of the cabinet. At the outermost end of the carriage is another heavy rod 33, the ends of which project through the frame members 24 and form pivots for the long link members 35.

Means are provided for supporting the outer end of the carriage and for this purpose there are links 36, one at either side of the carriage, each pivotally connected to a mid portion of a corresponding link 35 by pivot pin 38, and supported from a pivot pin 39 fastened to a bracket 40 near a corner of the cabinet 10. At the lower end of each link 35 is a roller 42 which is vertically movable in guide channel 44 extending part way up one of the legs 12, thus guiding the lower end of the links 35 in a vertical path. By reason of the link motion and the guides, the outer end of the carriage 22 travels in substantially a horizontal plane and is at all times supported. The weight of the levers 35 and 36 is lifted as the carriage is pulled out from between the lamps, and consequently the weight of these levers tends to restore the carriage to its normal position between the lamp banks 15.

Manual means are provided for rapidly moving the carriage to its loading or outside position, for locking it in that position and for controlling its return to plate burning position. As embodied, shaft 45 is journalled in bearings 46 mounted on the side walls of the cabinet 10, and at either end of the shaft and fast thereto is an arm 49, carrying a roller 50 rotatable thereon to bear against a cam plate 51. Plate 51 has a stop portion 52 and is fixed to the adjacent edge of the link 36 near pivot pin 39. One of the arms 49 is provided with a handle 54 by which both arms 49 may be swung and brought to the full line position shown in Figure 1. In this position a line passing through the center of roller 50 and shaft 45 is substantially perpendicular to the contacting face of cam plate 51 and there is no tendency for the weight of the lever system to lift the arms 49 and allow the return of the carriage to heating position. The travel of the arms 49 is limited by the stop portions 52 of the cam plate.

As the handle 54 is moved from its normal position, shown in dot dash lines in Figure 1, to the loading position, as shown in full lines, the rollers 50 press against the upper portion of the cam plates 51. Continued downward pressure on the handle rigidly swings the links 36 outwardly away from the cabinet raising the links 35 and pulling the carriage outwardly towards loading position as shown, the links 35 and 36 control the path of movement of the outer end of the carriage and cause it to travel in a substantially horizontal plane. When the plate has been placed on the strips 28, with its coated side upward, the operator may lift the handle 54 and control the inward motion of the carriage by the rate at which he allows the handle to rise. When the carriage is fully within the cabinet, the links 35 and 36 are at their lowermost positions, and cam plates 51 bear against the rollers 50 to hold the handle in its upper position.

When the plate has been fully burned, the motions are repeated to withdraw the carriage and plate to loading position where the burned plate may be removed and a new plate laid on the carriage.

The invention in its broader aspects is not limited to the specific mechanisms shown and described but departures may be made therefrom within the scope of the accompanying claims without departing from the principles of the invention and without sacrificing its chief advantages.

What is claimed is:

1. In an apparatus for burning photo-engraving plates having a burning-cabinet structure, the combination of a carriage mounted for movement horizontally into and out of said cabinet structure; a lever system tending to move said carriage into said cabinet structure, said lever system including a first arm pivotally connected at one end to the outer end of said carriage and slidably connected at its other end to said cabinet structure below said carriage, and a second arm pivotally connected at one end to said first arm between its ends and at its other end to said cabinet structure above said carriage, said second arm having a cam follower portion including a cam stop; and, cam means pivotally carried by said cabinet structure engageable with said cam follower for moving said carriage out of said cabinet structure against the resistance offered by said lever system, said cam means including an operating handle by which it is movable to an equilibrium position in which said lever system is releasably locked.

2. In an apparatus for burning photo-engraving plates between upper and lower horizontally extending banks of infra-red radiant heaters, the combination of a carriage mounted for substantially horizontal movement between said banks, a trackway for guiding one end of said carriage, a lever system comprising a link connected near the other end of said carriage by a pivot at one end of the link and vertically slidable in a guide at its other end and a second link pivotally interconnecting the first link with the cabinet structure, and cam means operating on the second link to overpower the weight of the links and move the carriage and lock it out of the zone of the heaters.

FRANK T. POWERS.

REFERENCES CITED

The following references are of record in the file of this patent:

UNITED STATES PATENTS

| Number | Name | Date |
| --- | --- | --- |
| 884,457 | Boydelatour | Apr. 14, 1908 |
| 1,320,497 | Schey | Nov. 4, 1919 |
| 2,061,358 | Hunter et al. | Nov. 17, 1936 |
| 2,139,990 | Weiskittel | Dec. 13, 1938 |
| 2,308,239 | Bell | Jan. 12, 1943 |